United States Patent [19]

Allison

[11] Patent Number: 4,525,631
[45] Date of Patent: Jun. 25, 1985

[54] PRESSURE ENERGY STORAGE DEVICE

[76] Inventor: John H. Allison, 43040 Penny, Sterling Heights, Mich. 48078

[21] Appl. No.: 569,722

[22] Filed: Jan. 10, 1984

Related U.S. Application Data

[63] Continuation-in-part of Ser. No. 335,983, Dec. 30, 1981, Pat. No. 4,447,738.

[51] Int. Cl.³ .............................................. F01C 13/00
[52] U.S. Cl. ...................................... 290/4 R; 290/44
[58] Field of Search .............. 290/1 R, 4 R, 4 C, 4 D, 290/44, 55

[56] References Cited

U.S. PATENT DOCUMENTS

| | | | |
|---|---|---|---|
| 2,433,896 | 1/1948 | Gay ..................................... | 290/4 D |
| 2,539,862 | 1/1951 | Rushing ............................. | 290/44 X |
| 4,186,312 | 1/1980 | Dvorak ............................... | 290/4 R |
| 4,206,608 | 6/1980 | Bell .................................... | 290/4 R X |
| 4,229,661 | 10/1980 | Mead et al. ........................... | 290/44 |
| 4,370,559 | 1/1983 | Langley, Jr. ........................ | 290/1 R |
| 4,392,062 | 7/1983 | Bervig ............................... | 290/1 R X |

Primary Examiner—William M. Shoop
Assistant Examiner—W. E. Duncanson, Jr.
Attorney, Agent, or Firm—Remy J. VanOphem

[57] ABSTRACT

A pressure energy storage device for the storage of kinetic energy of rotation in the form of potential energy of a compressed fluid and for converting the potential energy of the compressed fluid into kinetic energy of rotation. The pressure energy storage device includes a storage reservoir, a compressor driven by a rotating source to deliver pressurized fluid to the storage reservoir, and a primary fluid motor selectively operable to generate rotary motion by drawing off a portion of the pressurized fluid. The pressure energy storage device may be provided with an electric motor to drive the compressor, a generator driven by the primary fluid motor, a secondary fluid motor to drive the compressor by the exhaust fluid from the primary fluid motor, and an auxiliary pressurized fluid outlet, permitting the compressor to be driven by a rotating power source or an electrical power source and permitting the potential energy of the pressurized fluid to be used directly or to be converted to rotary motion or electrical current, as needed.

25 Claims, 2 Drawing Figures

PRESSURE ENERGY STORAGE DEVICE

CROSS REFERENCE

The present application is a continuation-in-part application of copending U.S. patent application Ser. No. 335,983 filed Dec. 30, 1981, now U.S. Pat. No. 4,447,738, issued May 8, 1984.

BACKGROUND OF THE INVENTION

The present invention relates to energy storage and transformer devices and, more particularly, to a device for storing kinetic energy of rotation in the form of potential energy of a compressed fluid and for reconverting the potential energy of the compressed fluid to kinetic energy of rotation. Furthermore, the present invention relates to devices for transforming various forms of available energy into various forms of needed energy. More particularly, the present invention is directed to a device which converts available energy in the form of kinetic energy or in the form of electrical energy to a needed form of energy, such as potential energy of compressed fluid, kinetic energy of rotation, or electrical energy.

Historically, various single purpose devices have been designed for converting one form of available energy into a specific form of needed energy. For example, windmills have been designed to convert the kinetic energy available in the motion of air to kinetic energy for the purpose of rotating a grinding wheel to grind flour. More recently, windmills have been designed to convert the kinetic energy of motion available in the motion of air to electrical energy. Still other single purpose devices have been designed, for example, to convert electrical energy into potential energy of compressed fluid, for example, for driving tools powered by compressed fluid. Generators, motors, and alternators have been designed to convert energy from kinetic energy of rotation to electrical energy and from electrical energy to kinetic energy of rotation. These and many other single purpose energy conversion transformer devices have been in widespread use for many years.

Until recently, however, the most common energy transformers in use were those that converted either to or from electrical energy. This was due to the ready availability of electrical energy from huge power plants distributed by a large network of power supply lines.

However, the recent increases in cost of electrical energy, due mainly to the increases in the cost of fossil fuels used to generate the electrical energy at the power plants, have resulted in an increasing tendency for the user of energy to attempt to use many other available energy resources, such as the kinetic energy available in the wind or in flowing water, and such as solar energy. Additionally, excess energy may be available from existing rotating machinery, which energy may be recovered with a suitable energy transformer.

Therefore, it would be useful to have an energy transformer capable of receiving input from the various available energy sources and capable of converting this available energy to a useful form of energy. Preferably, such a device would permit storage of the available energy in some form until it was needed. Furthermore, such a device would preferably be capable of supplying output energy in the form in which it is needed, such as in the form of kinetic energy of rotation, electrical energy, or potential energy of a compressed fluid.

SUMMARY OF THE PRESENT INVENTION

The present invention provides a pressure energy storage device having these characteristics, as well as several other major advantages.

The pressure energy storage device of the present invention includes a storage reservoir, a compressor driven by a rotating source to deliver pressurized fluid to the storage reservoir, and a primary fluid motor selectively operable to generate rotary motion by drawing off a portion of pressurized fluid.

The pressure energy storage device may further be provided with an electric motor so as to permit the compressor to be alternatively driven by a source of kinetic energy of rotation or an electrical source.

The pressure energy storage device of the present invention may be provided with a generator interconnected with the primary fluid motor, thereby permitting the energy to be recovered from the pressure energy storage device, either in the form of kinetic energy of rotation or in the form of electrical energy, as needed.

The pressure energy storage device of the present invention may be provided with an auxiliary pressurized fluid outlet, thereby permitting power to be drawn from the pressure energy storage device in the form of either kinetic energy of rotation supplied by the compressor or in the form of potential energy of compressed fluid supplied by the auxiliary outlet, as needed.

The pressure energy storage device of the present invention may be provided with a secondary air motor interconnected with the compressor, such that the compressor may be driven by the secondary air motor. The inlet of the secondary air motor may be interconnected with the outlet of the primary air motor so as to permit recovery of a portion of the potential energy in the compressed fluid which is not recovered by the primary fluid motor.

The pressure energy storage device of the present invention preferably uses air as the pressurized fluid. Furthermore, in the preferred embodiment, the pressure energy storage device includes a hollow storage tank, a compressor mounted to the storage tank and rotatably drivable to supply pressurized air to the storage tank, and a primary fluid motor mounted to the storage tank selectively operable to generate a rotary output motion by drawing off a portion of the pressurized air. An electric motor and a secondary air motor are each mounted to the storage tank adjacent the compressor and are interconnected with the compressor so as to be selectively operable to drive the compressor. The exhaust outlet of the primary air motor is interconnected with the intake of the secondary air motor. A generator is mounted to the storage tank adjacent the primary air motor and is interconnected with the primary air motor so as to be rotatably driven thereby. An auxiliary pressurized fluid outlet is provided for the storage tank. Thus, the pressure energy storage device converts electrical energy and kinetic energy of rotation to potential energy in the form of compressed air which may be stored for later use or used immediately in the form of potential energy of compressed air, electrical energy, or kinetic energy of rotation, as needed.

The primary object of the present invention is to provide a device capable of storing a kinetic energy of rotary motion in the form of potential energy of a compressed fluid for later use as kinetic energy of rotation.

Furthermore, the kinetic energy of rotation may be continuously or sporadically drawn from the device during periods of continuous or sporadic input of kinetic energy of rotation to the device, so as to permit the operation of a device requiring kinetic energy of rotation independently of the cyclical availability of kinetic energy of rotation from an input source. Furthermore, the output kinetic energy of rotation may be converted, by a generator, into electrical energy. Finally, potential energy of the compressed fluid may be used directly, if needed.

Another object of the present invention is to provide a device capable of storing electrical energy or, alternatively, kinetic energy of rotation, for a later or concurrent use of power.

Another object of the present invention is to provide a device capable of storing energy, as available and when available, and supplying energy in various forms, as needed. Preferably, the energy is available in the form of potential energy of a compressed fluid, kinetic energy of rotary motion, or electrical energy, whichever is needed.

Still another object of the present invention is to provide a device capable of storing electrical energy when the cost of electrical energy is low and resupply the electrical energy when the cost of electrical energy is high. The present invention accomplishes this result by converting the electrical energy when available at a low cost to potential energy of a compressed fluid. The potential energy of a compressed fluid may be reconverted to electrical energy when needed or, alternatively, may be reconverted to electrical energy when the cost of electrical energy is high and sold back to the power company.

It is another object of the present invention to provide an energy storage device for storing energy for later recovery in the form of potential energy of a compressed fluid having an efficient secondary system for recovering a portion of the potential energy which would otherwise be wasted. The present invention accomplishes this result by providing a secondary air motor having an intake interconnected with the exhaust of the primary air motor so as to recapture a portion of the potential energy in the compressed fluid which would otherwise be wasted.

Still yet another object of the present invention is to provide a compact and portable multi-purpose energy storage device which may be used, as needed, to supply energy in various forms and, further, may be recharged with energy from various available sources.

These and many other objects, features, and advantages of the present invention will become apparent to those skilled in the art when the following detailed description of the preferred embodiment is read in conjunction with the drawings appended hereto.

DETAILED DESCRIPTION OF THE PREFERRED EMBODIMENT

Figure 1:
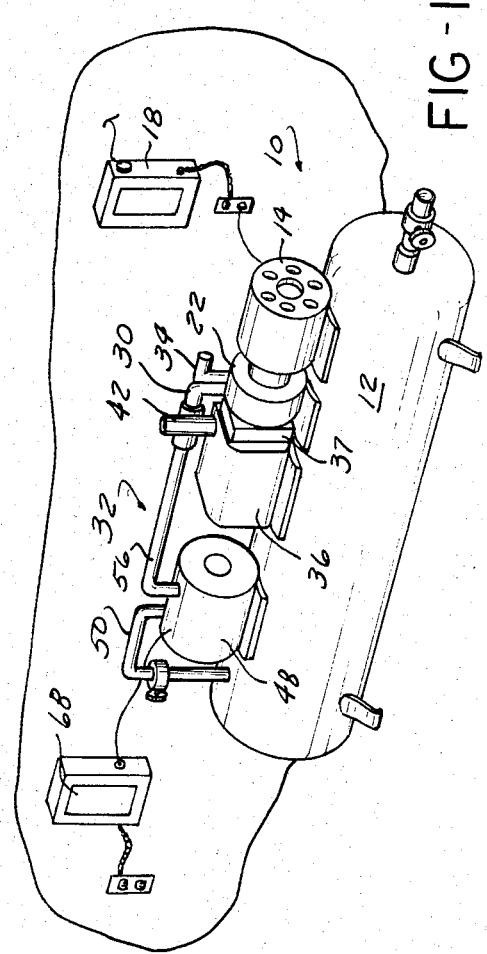
FIG. 1 is a perspective view of a pressure energy storage device according to the present invention.
Figure 2:
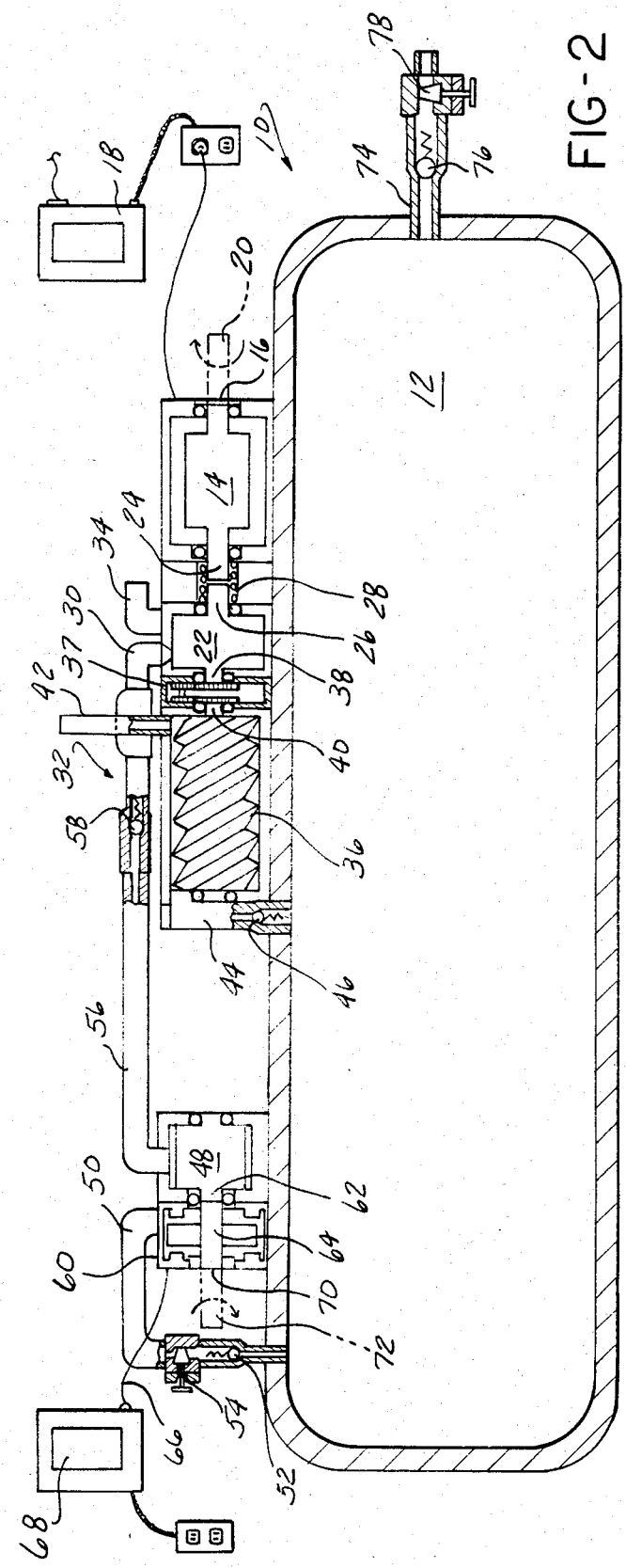
FIG. 2 is a schematic view illustrating the elements and function of the pressure energy storage device of FIG. 1.

Referring now to the drawing, FIGS. 1 and 2 depict an example of a pressure energy storage device 10 according to the present invention. The pressure energy storage device 10 illustrated in the drawing and described herein constitutes the preferred embodiment of the present invention and, accordingly, includes many features which are desirable but not essential to the present invention. Furthermore, many variations and modifications may be made from the preferred embodiment without departing from the spirit of the present invention.

As best shown in FIG. 2, the pressure energy storage device 10 includes a storage reservoir 12 capable of storing a compressed fluid which, in the preferred embodiment, is air. The storage reservoir 12 is cylindrically shaped and freestanding with its cylindrical axis disposed parallel to the ground.

An electric motor 14 is mounted to the upper surface of the storage reservoir. The electric motor 14 is provided with a rotary input coupling 16, shown only schematically in FIG. 2. The electric motor 14 is selectively interconnected with an electric power source 18. The electric power source 18 may be a municipal power source or, alternatively, may be the output of a solar array or any other source of electrical energy.

It should be noted that the electric motor 14 may also be supplied with power by any available rotary power source 20, as indicated schematically in FIG. 2. The rotary power source may be driven by a windmill or water wheel, if available. Alternatively, the rotary power source may consist of existing rotating machinery having excess power. Thus, a rotary input coupling 16 may be used to recover excess kinetic energy of rotation from any conceivable source.

A secondary air motor 22 is mounted to the top of the upper surface of the storage reservoir 12 adjacent the electric motor 14. An output shaft 24 of the electric motor 14 is interconnected with an input shaft 26 of the secondary air motor 22, such that the secondary air motor is rotatably driven by the electric motor 14 or the rotary power source 20. A spring clutch 28 is provided between the output shaft 24 and the input shaft 26 so that the secondary air motor will not drive the output shaft 24 of the electric motor when the output shaft is rotating slower than the input shaft 26.

The secondary air motor is provided with a secondary air motor intake line 30 which is part of a feedback system 32, described later, for reducing energy losses. The secondary air motor 22 is also provided with a secondary air motor exhaust line 34 leading to the ambient atmosphere.

A compressor 36 is mounted to the upper surface of the storage reservoir 12 in a location adjacent to the secondary air motor 22. The secondary air motor 22 has an output shaft 38 interconnected with an input shaft 40 of the compressor 36. The input shaft 40 of the compressor 36 is, therefore, rotatably driven by the electric motor 14, the rotary power source 20, and/or the secondary air motor 22. A gear reduction box 37, well known in the art, may be interposed the output shaft 38 of the secondary air motor 22 and the input shaft 40 of the compressor 36 such that the compressor will be rotated more rapidly than the secondary air motor 22, the electric motor 14, or the rotary power source 20 so that the kinetic energy is efficiently converted to potential energy of compressed air by the compressor.

The compressor 36 is provided with a compressor intake line 42 drawing air from the ambient atmosphere. The compressor 36 is further provided with a compressor exhaust line 44 extending from the compressor to the storage reservoir 12. A first check valve 46 is provided along the compressor exhaust line 44 to assure that the compressed air in the storage reservoir will not escape into the compressor 36.

A primary air motor 48 is also mounted to the upper surface of the storage reservoir 12. The primary air motor 48 is provided with a primary air motor intake line 50 extending from the primary air motor to the storage reservoir 12. A second check valve 52 is disposed along the primary air motor intake line 50 so as to prevent the inadvertent passage of air from the primary air motor to the storage reservoir along the primary air intake line. A first regulator 54 is also provided along the primary air motor intake line 50 so as to permit selective operation of the primary air motor. The primary air motor 48 is further provided with a primary air motor exhaust line 56 which forms a component of the feedback system 32 referred to earlier. The primary air motor exhaust line 56 is interconnected with the secondary air motor intake line 30. A third check valve 58 is provided between the primary air motor exhaust line 56 and the secondary air motor intake line 30 to assure that air flows only in the direction from the primary air motor to the secondary air motor. The feedback system 32 permits the secondary air motor to recover a portion of energy which would otherwise be wasted, in a manner to be described later.

The pressure energy storage device 10 of the present invention further includes a generator 60 mounted to the upper surface of the storage reservoir 12 adjacent the primary air motor 48. The generator 60 is preferably a low speed alternator. An output shaft 62 of the primary air motor 48 is interconnected with an input shaft 64 of the generator 60 so that the generator is driven by the primary air motor. The generator is provided with a power outlet line 66 which may be connected with any device utilizing electrical power. In the drawing, the power outlet line 66 is shown interconnected with a fusebox 68 such as to permit the generator to supply power to a building's circuits or, alternatively, to permit the transmission of electrical power into the municipal grid.

The generator 60 is further provided with a rotary output coupling 70, shown only schematically in the drawing, permitting the interconnection thereto of a rotary power consuming device 72, also shown schematically. Thus, the primary air motor 48 may be used to supply, as an output, either electrical energy or kinetic energy in rotation, whichever is needed.

The pressure energy storage device 10 of the present invention is further provided with a reservoir output line 74 provided with a fourth check valve 76 and a second regulator 78. The reservoir output line 74 selectively permits direct use of the compressed air in the storage reservoir 12 as a power source, for example, to power pneumatically operated tools.

The pressure energy storage device of the present invention is operated as follows.

The storage reservoir 12 is capable of storing energy in the form of potential energy in compressed air. The compressed air is supplied to the storage reservoir 12 by the compressor 36 which is rotatably driven by either the electric power source 18 interconnected with the electric motor 14 or by a rotary power source 20 interconnected with the rotary input coupling 16, or by both. Power may be supplied to the storage reservoir 12 by either power source continuously, cyclically, or sporadically.

When energy is needed from the pressure energy storage device 10 in the form of compressed air, the second regulator 78 is operated to permit the passage of pressurized air along the reservoir output line 74.

When energy is needed in the form of either kinetic energy of rotation or in the form of electrical energy, the first regulator 54 is operated to permit passage of compressed air across the primary air motor 48 so as to rotate the output shaft 62. Energy may, therefore, be drawn from the primary air motor exhaust line in the form of electrical energy generated by the generator 60 or in the form of rotary kinetic energy of rotation for use by the rotary power consuming device 72 interconnected with the rotary output coupling 70. If needed, energy may be simultaneously drawn from the storage reservoir 12 in two or more forms.

The primary air motor 48, however, will not efficiently recover all of the potential energy which has been stored in the compressed air in the storage reservoir 12. The air exhausted by the primary air motor 48 will still be pressurized to a pressure above that of the ambient atmosphere. Therefore, the exhaust air from the primary air motor 48 is directed by the feedback system 32 across the secondary air motor 22. The secondary air motor 22 will, therefore, recover a portion of the otherwise wasted potential energy in the compressed air and will drive the compressor 36. This will resupply the storage reservoir with some of the additional compressed air, even when the electric power source 18 and the rotary power source 20 are inoperative. When either or both of the electric power source 18 and the rotary power source 20 are operative, the secondary air motor 22 will supply an increased torque to the compressor 36 and increase the amount of pressurized air supplied to the storage reservoir 12.

It will readily be appreciated by one skilled in the art that the pressure energy storage device of the present invention may be used in many applications which do not require the capability to accept energy in multiple forms and to distribute energy in multiple forms. Thus, for example, when input energy is always available in the form of rotary motion and output energy is always used in the form of rotary motion, the pressure energy storage device will not require the electric motor 14, the generator 60, and the reservoir output line 74. When an efficient primary air motor is used, such as a multistaged air motor, for the primary air motor 48, the feedback system 32 and the secondary air motor 22 may not be needed. However, it will be appreciated that provision of these additional components will result in a more functional and efficient multi-purpose device.

It will further be appreciated that the various elements interconnected with the upper surface of the storage reservoir 12 may be manufactured in modular form so as to permit their removal when not needed.

The pressure energy storage device of the present invention is capable of receiving energy in a multitude of forms and supplying energy in a multitude of forms, as described above. Furthermore, the pressure energy storage device of the present invention may be used as an energy transformer for continuous use for the purpose of continuously transforming input energy in one form into output energy in a second form. Alternatively, the pressure energy storage device of the present invention may be used as an energy rectification device for converting energy available in a cyclical, erratic, or sporadic form, into a continuous energy output. For example, if the source of energy is a windmill supplying kinetic energy of rotation to the rotary input coupling 16, the energy supply will be sporadic as a result of gusts of wind. As long as a sufficient amount of compressed air is supplied to the storage reservoir 12 on the average, however, energy may be continuously drawn from the primary air motor 48, independently of the gusts of wind.

An additional feature of the energy storage device of the present invention is that it may be used to store energy at times when energy is available at a low rate for use during times when energy is expensive. For example, many municipal power companies have begun to offer two or more rates for the cost of electricity, depending upon the time of day when the electricity is used. The pressure energy storage device 10 of the present invention may be used to store energy, in the form of potential energy in the compressed air in the storage reservoir 12, when the cost of electricity is low. The energy may subsequently be used in the desired form at a later time, when electrical energy is more expensive. Furthermore, the potential energy stored in the storage reservoir 12 may be reconverted into electrical energy by the generator 60 and retransmitted into the municipal power grid for resale to the utility company at a time when electrical energy is more expensive.

It will be appreciated by those skilled in the art that many modifications may be made to the above-described pressure energy storage device 10 without departing from the spirit of the present invention. For example, the pressure energy storage device 10 may be a portable or a stationary device. The storage reservoir 12 may conform so as to have an internal compartment for the electric motor 14, the primary and secondary air motors 48 and 22, the compressor 36, and the generator 60, so as to render the assembly more compact. Provision may be made for interconnection of the storage reservoir 12 to additional, add-on storage reservoirs to increase the capacity of the pressure energy storage device 10. These and many other modifications are included within the intended scope of the claims appended hereto.

What is claimed as novel is as follows:

1. A pressure energy storage device comprising:
   a storage reservoir for storing pressurized fluid;
   compressor means having compressor intake means, compressor exhaust means, and an input shaft, said compressor intake means being interconnected with a source of fluid, said compressor exhaust means being interconnected with said storage reservoir for fluid flow therebetween, said compressor means being selectively operable in response to rotary motion of said input shaft to draw fluid from said source of fluid, pressurize said fluid, and deliver said pressurized fluid to said storage reservoir;
   primary fluid motor means having primary fluid motor intake means, primary fluid motor exhaust means, and an output shaft, said primary fluid motor intake means being interconnected with said storage reservoir for fluid flow therebetween, said output shaft being rotatably driven by pressurized fluid flowing through said primary fluid motor means from said primary fluid motor intake means to said primary fluid motor exhaust means;
   control means selectively operable to permit said pressurized fluid in said storage reservoir to flow through said primary fluid motor means to generate rotary motion of said output shaft; and
   secondary fluid motor means interconnected with said input shaft such that said compressor means is selectively driven by said secondary fluid motor means, said secondary fluid motor means having secondary fluid motor intake means interconnected with a source of pressurized fluid and a secondary fluid motor exhaust means interconnected with a low pressure sink means.

2. The pressure energy storage device of claim 1 wherein said fluid is air and said source of pressurized fluid is the ambient atmosphere.

3. The pressure energy storage device of claim 1 further comprising check valve means interposed said compressor exhaust means and said storage reservoir, said check valve means preventing said pressurized fluid in said storage reservoir from flowing into said compressor means.

4. The pressure energy storage device of claim 1 wherein:
   said storage reservoir comprises a hollow storage tank;
   said compressor means comprises a fluid compressor mounted to said tank; and
   said primary fluid motor means comprises a fluid motor mounted to said tank.

5. The pressure energy storage device of claim 1 wherein said control means comprises a regulator valve interposed said primary fluid motor intake means and said storage reservoir.

6. The pressure energy storage device of claim 1 further comprising check valve means interposed said primary fluid motor intake means and said storage reservoir, said check valve means preventing the flow of fluid from said primary fluid motor intake means into said storage reservoir.

7. The pressure energy storage device of claim 1 further comprising:
   an electric motor interconnected with said input shaft such that said compressor means is driven by said electric motor, said pressure energy storage device thereby converting electric energy supplied to said electric motor to potential energy stored in said pressurized fluid.

8. The pressure energy storage device of claim 7 further comprising an electric generator interconnected with said output shaft such that said electric generator is driven to generate electrical current in response to the rotation of said output shaft, said pressure energy storage device thereby converting the potential energy stored in said pressurized fluid into electrical energy.

9. The pressure energy storage device of claim 7 further comprising rotary input coupling means interconnected with said input shaft, such that said input shaft is selectively rotatable by each of said electric motor and said rotary input coupling means.

10. The pressure energy storage device of claim 1 further comprising an electric generator interconnected with said output shaft such that said electric generator is driven to generate electrical current in response to the rotation of said output shaft, said pressure energy storage device thereby converting the potential energy stored in said pressurized fluid into electrical energy.

11. The pressure energy storage device of claim 10 further comprising rotary output coupling means interconnected with said output shaft, such that said output shaft is selectively usable to drive either one of said electric generator and said rotary output coupling means.

12. The pressure energy storage device of claim 1 further comprising storage reservoir output means for interconnection with a tool requiring a pressurized fluid input.

13. The pressure energy storage device of claim 12 further comprising check valve means for said storage reservoir output means, said check valve means permitting fluid flow therethrough only in the direction from said storage reservoir towards said tool.

14. The pressure energy storage device of claim 12 further comprising a regulator valve selectively operable to control the flow of pressurized fluid through said storage reservoir output means.

15. The pressure energy storage device of claim 1 wherein said primary fluid motor exhaust means is interconnected with said secondary fluid motor intake means such that said secondary fluid motor means recovers a portion of the potential energy stored in said pressurized fluid which is not converted by said primary fluid motor means to rotary motion of said output shaft.

16. The pressure energy storage device of claim 15 further comprising a check valve interposed said primary fluid motor exhaust means and said secondary fluid motor intake means, said check valve permitting pressurized fluid to flow only in the direction from said primary fluid motor means to said secondary fluid motor means.

17. The pressure energy storage device of claim 1 further comprising:
an electric motor interconnected with said input shaft such that said compressor means is driven by said electric motor, said pressure energy storage device thereby converting electric energy supplied to said electric motor to potential energy stored in said pressurized fluid; and
clutch means interposed said electric motor and said secondary fluid motor means, such that either of said electric motor and said secondary fluid motor means drives said input shaft but said electric motor is not driven by said secondary fluid motor means.

18. A pressure energy storage device comprising:
a storage tank having a storage reservoir formed therein for storing pressurized air;
an air compressor mounted to said storage tank, said air compressor comprising compressor intake means, compressor exhaust means, and an input shaft, said compressor intake means communicating with the ambient atmosphere, said compressor exhaust means being interconnected with said storage reservoir for fluid flow therebetween, said air compressor being selectively operable in response to rotary motion of said input shaft to draw air from the ambient atmosphere, pressurize said air, and deliver said pressurized air to said storage reservoir;
check valve means interposed said compressor exhaust means and said storage reservoir, said check valve means preventing said pressurized air in said storage reservoir from flowing into said air compressor;
a primary air motor having primary air motor intake means, primary air motor exhaust means, and an output shaft, said primary air motor being mounted to said storage tank, said primary air motor intake means being interconnected with said storage reservoir for fluid flow therebetween, said primary air motor exhaust means being interconnected with low pressure sink means, said output shaft being rotatably driven by said pressurized air flowing through said primary air motor from said primary air motor intake means to said primary air motor exhaust means;
a regulator valve interposed said primary air motor intake means and said storage reservoir, said regulator valve permitting selective operation of said primary air motor to convert the potential energy stored in said pressurized air to kinetic energy of said output shaft; and
a secondary air motor mounted to said storage tank adjacent said air compressor, said secondary air motor having secondary air motor intake means, exhaust means, and an output shaft, said output shaft being interconnected with said input shaft of said air compressor such that said air compressor is selectively driven by said secondary air motor, said secondary air motor intake means being interconnected with said primary air motor exhaust means, said secondary air motor exhaust means being in communication with the ambient atmosphere such that said secondary air motor recovers a portion of the potential energy stored in said pressurized air which is not converted by said primary air motor to rotary motion of said output shaft of said primary air motor.

19. The pressure energy storage device of claim 18 further comprising:
an electric motor interconnected with said input shaft such that said air compressor is driven by said electric motor, said pressure energy storage device thereby converting electric energy supplied to said electric motor to potential energy stored in said pressurized air.

20. The pressure energy storage device of claim 18 further comprising an electric generator interconnected with said output shaft such that said electric generator is driven to generate electrical current in response to the rotation of said output shaft, said pressure energy storage device thereby converting the potential energy stored in said pressurized air into electrical energy.

21. The pressure energy storage device of claim 18 further comprising:
storage reservoir output means for interconnection with a tool requiring a pressurized air input; and
an output regulator valve selectively operable to control the flow of air through said storage reservoir output means.

22. A pressure energy storage device comprising:
a storage reservoir for storing pressurized fluid;
compressor means having compressor intake means, compressor exhaust means, and an input shaft, said compressor intake means being interconnected with a source of fluid; said compressor exhaust means being interconnected with said storage reservoir for fluid flow therebetween, said compressor means being selectively operable in response to rotary motion of said input shaft to draw fluid from said source of fluid, pressurize said fluid, and deliver said pressurized fluid to said storage reservoir;
first check valve means interposed said compressor exhaust means and said storage reservoir, said first check valve means preventing said pressurized fluid in said storage reservoir from flowing into said compressor means;

secondary fluid motor means disposed adjacent said compressor means, said secondary fluid motor means having a secondary fluid motor intake means, secondary air motor exhaust means, and a secondary air motor shaft, said secondary air motor exhaust means being interconnected with the ambient atmosphere, said secondary air motor shaft being interconnected with said input shaft of said compressor means, said secondary air motor shaft being rotatably driven when pressurized air flows from said secondary fluid motor intake means to said secondary fluid motor exhaust means;

an electric motor disposed adjacent said secondary air motor means, said electric motor being interconnected with said secondary air motor shaft such that said electric motor is selectively operable to rotatably drive said secondary air motor shaft;

primary fluid motor means having primary fluid motor intake means, primary fluid motor exhaust means, and an output shaft, said primary fluid motor intake means being interconnected with said storage reservoir for fluid flow therebetween, said output shaft being rotatably driven by pressurized fluid flowing through said primary fluid motor means from said primary fluid motor intake means to said primary fluid motor exhaust means, said primary fluid motor exhaust means being interconnected with said secondary fluid motor intake means for fluid flow therebetween;

an electric generator disposed adjacent said primary fluid motor means, said electric generator having a generator shaft interconnected with said output shaft of said primary fluid motor means, such that said electric generator is driven to generate electrical current in response to the rotation of said output shaft;

second check valve means interposed said primary fluid motor exhaust means and said secondary fluid motor intake means, said second check valve means preventing the flow of fluid from said secondary fluid motor means to said primary fluid motor means; and control means selectively operable to permit said pressurized fluid in said storage reservoir to flow through said primary fluid motor means to generate rotary motion of said output shaft, said control means comprising a regulator valve interposed said primary fluid motor intake means and said storage reservoir.

23. The pressure energy storage device of claim 22 wherein said fluid is air and said source of pressurized fluid is the ambient atmosphere.

24. The pressure energy storage device of claim 22 further comprising storage reservoir output means for interconnection with a tool requiring a pressurized fluid input.

25. The pressure energy storage device of claim 22 wherein:

said storage reservoir comprises a hollow storage tank;

said compressor means comprises a compressor mounted to said storage tank;

said secondary fluid motor means comprises a first fluid motor mounted to said storage tank adjacent said compressor;

said electric motor is mounted to said storage tank adjacent said secondary fluid motor;

said primary fluid motor means comprises a second fluid motor mounted to said storage tank; and said electric generator is mounted to said storage tank adjacent said secondary fluid motor means.

* * * * *